US009678771B2

(12) United States Patent
Singleton, IV et al.

(10) Patent No.: US 9,678,771 B2
(45) Date of Patent: Jun. 13, 2017

(54) AUTONOMIC VIRTUAL MACHINE SESSION LINGERING OF INACTIVE VIRTUAL MACHINE SESSIONS BY A VIRTUALIZATION COMPUTING PLATFORM

(71) Applicant: Citrix Systems, Inc., Fort Lauderdale, FL (US)

(72) Inventors: Leo C. Singleton, IV, Fort Lauderdale, FL (US); Steven N. Short, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 441 days.

(21) Appl. No.: 13/955,213

(22) Filed: Jul. 31, 2013

(65) Prior Publication Data

US 2015/0040122 A1   Feb. 5, 2015

(51) Int. Cl.
G06F 9/46 (2006.01)
G06F 9/455 (2006.01)
G06F 9/50 (2006.01)

(52) U.S. Cl.
CPC ...... *G06F 9/45533* (2013.01); *G06F 9/45558* (2013.01); *G06F 9/5022* (2013.01); *G06F 9/5077* (2013.01); *G06F 2009/4557* (2013.01); *G06F 2009/45562* (2013.01); *G06F 2209/5022* (2013.01)

(58) Field of Classification Search
None
See application file for complete search history.

(56) References Cited

U.S. PATENT DOCUMENTS

| 8,726,337 | B1 * | 5/2014 | Curry | G06F 21/50 |
| | | | | 713/168 |
| 8,997,093 | B2 * | 3/2015 | Dimitrov | G06F 8/61 |
| | | | | 718/1 |
| 9,055,139 | B1 * | 6/2015 | Devireddy | H04L 67/2809 |
| 2008/0235285 | A1 * | 9/2008 | Della Pasqua | G06Q 10/107 |
| 2009/0293056 | A1 * | 11/2009 | Ferris | G06F 9/5077 |
| | | | | 718/1 |
| 2011/0029970 | A1 | 2/2011 | Arasaratnam | |

(Continued)

OTHER PUBLICATIONS

"Cellular Disco: Resource Management Using Virtual Clusters on Shared-Memory Multiprocessors"; Kinshuk Govil, et al.; Operating Systems Review, ACM (vol. 33, No. 5), Dec. 1, 1999, pp. 154-169.

(Continued)

*Primary Examiner* — Bradley Teets
(74) *Attorney, Agent, or Firm* — Banner & Witcoff, Ltd.

(57) ABSTRACT

Virtual machine sessions may be hosted by a virtualization computing platform. A portion of the virtual machine sessions that are inactive may be identified. The virtualization computing platform may continue to host the virtual machine sessions that are inactive. A determination may be made that utilization of one or more resources associated with the virtualization computing platform exceeds a threshold. Responsive to determining that utilization of the one or more resources associated with the virtualization computing platform exceeds the threshold, the virtualization computing platform may cease to host one or more of the portion of virtual machine sessions that are inactive.

19 Claims, 11 Drawing Sheets

(56) References Cited

U.S. PATENT DOCUMENTS

| | | | |
|---|---|---|---|
| 2011/0145505 A1* | 6/2011 | Anand | G06F 12/0895 |
| | | | 711/130 |
| 2012/0173730 A1* | 7/2012 | Krumpe, Jr. | G06F 9/5072 |
| | | | 709/226 |
| 2013/0145367 A1* | 6/2013 | Moss | H04L 43/04 |
| | | | 718/1 |

OTHER PUBLICATIONS

International Search Report and Written Opinion of corresponding International Application No. PCT/US2014/049208, mailed Oct. 24, 2014.

* cited by examiner

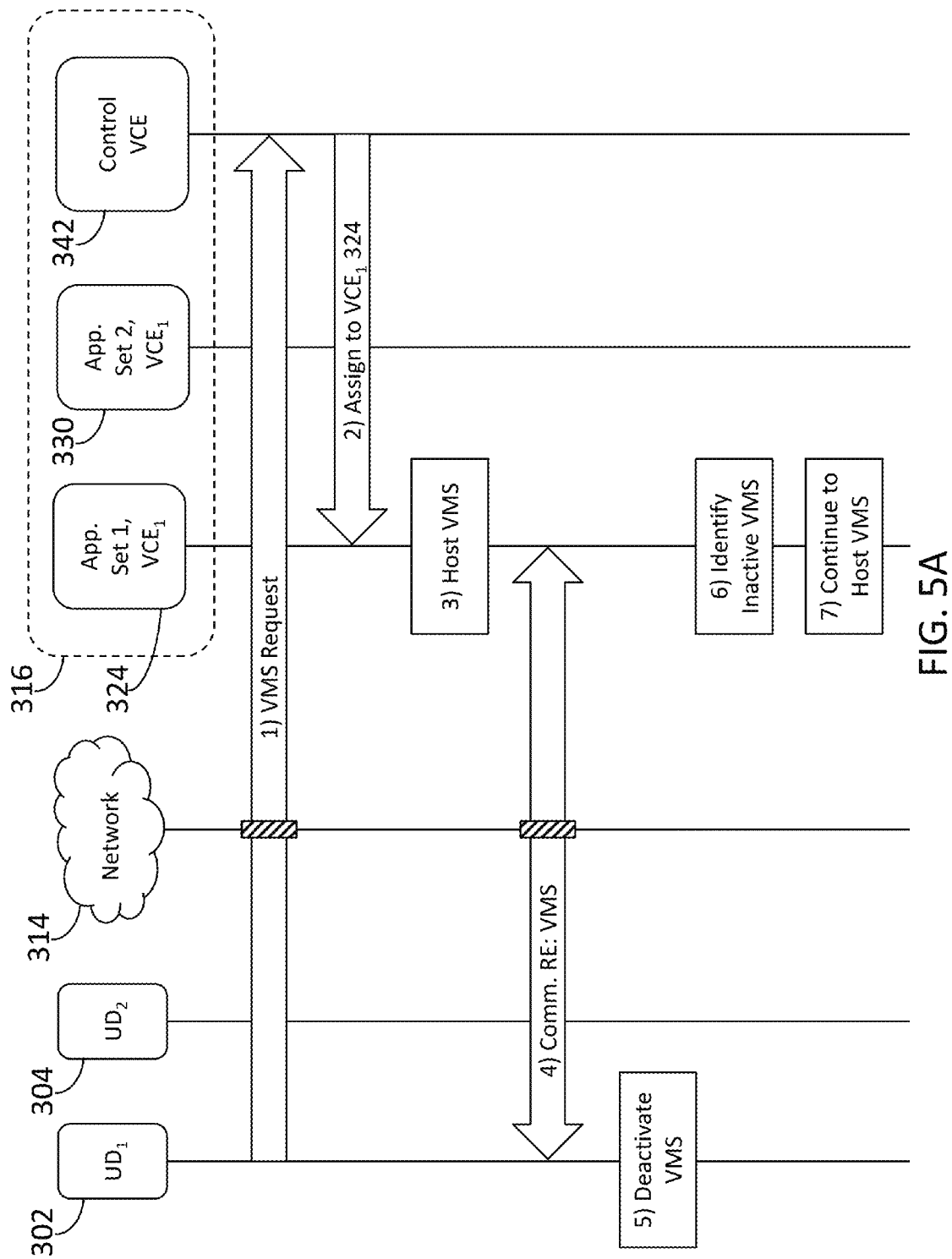

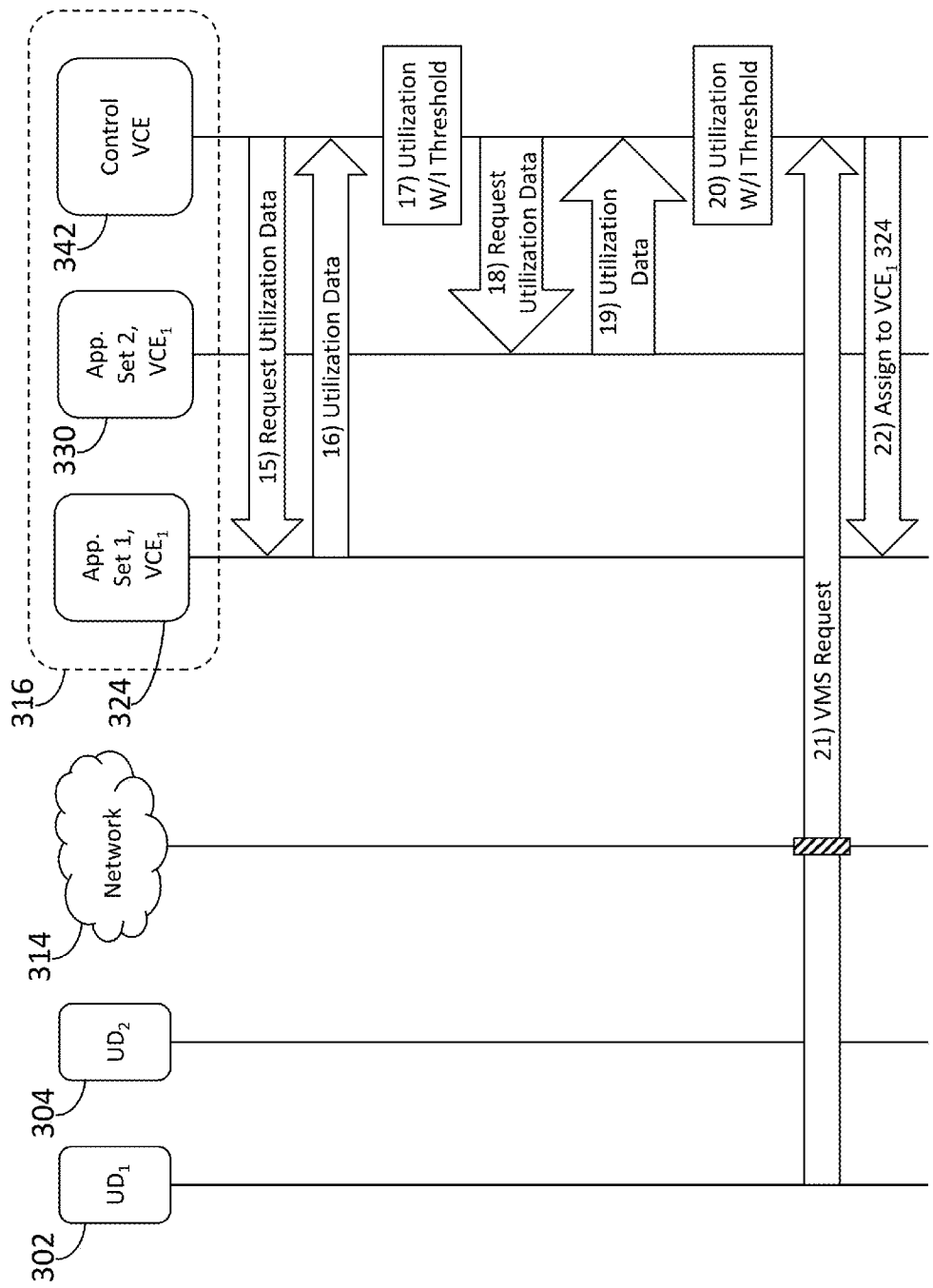

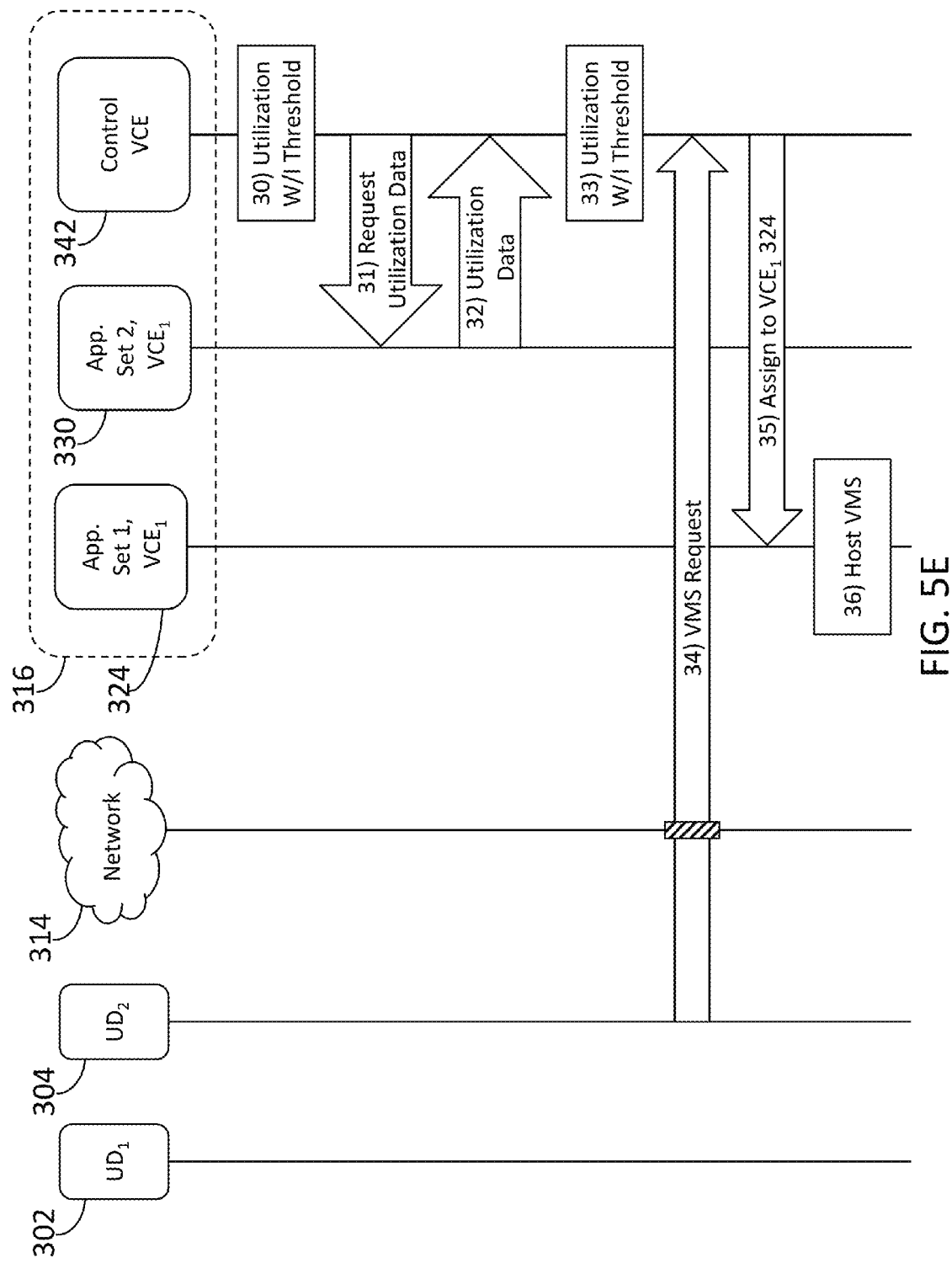

AUTONOMIC VIRTUAL MACHINE SESSION LINGERING OF INACTIVE VIRTUAL MACHINE SESSIONS BY A VIRTUALIZATION COMPUTING PLATFORM

FIELD

This application generally relates to computer virtualization and virtual machine session lingering. In particular, this application relates to autonomic virtual machine session lingering.

BACKGROUND

Virtual machines are widely utilized for both consumer and enterprise applications. Consumers prefer virtual machines because they offer a secure and simple alternative to local customized installations, which may prove technically demanding or vulnerable to malicious software. Administrators often opt to deploy virtual machines due to their scalability, security, and platform-agnostic accessibility.

Some organizations utilize virtual machine sessions to provide users with access to one or more specific applications. Often the resources required to initialize or instantiate a virtual machine session (e.g., a virtualized desktop or operating system (OS) environment) are greater than the resources required to initialize or run the application within the virtual machine session. Thus, an end user who has requested a virtualized instance of a specific application may be forced to wait substantial time for an underlying virtual machine session to be initialized.

One approach to reducing this overhead startup time is to configure user devices to request that virtual machine sessions be initialized prior to a time when a user is expected to request their creation (e.g., at a time of day preceding a time at which a user of the device has historically requested virtual machine sessions be created). This approach may provide the user with an improved experience by shifting the overhead processing to a point in time prior to the user's virtual machine session request. One problem with this approach is that many devices do not maintain continuous network connectivity (e.g., mobile devices) and thus may not be able to request initialization prior to the user's request.

Another approach to reduce this overhead startup time is to continue to host virtual machine sessions after a user has closed the underlying application (or to allow such virtual machine sessions to "linger"), and then utilize the hosted virtual machine session to run an application subsequently requested by the user. This approach reduces the time required for subsequent application requests by the user because a new virtual machine session does not have to be initialized. One problem with this approach is determining how long to continue to host the virtual machine session. If too short of a period is selected, a virtual machine session may not remain hosted long enough to be utilized in fulfilling any subsequent requests from the user. If too long of a period is selected, subsequent requests from other users may go unfilled due to an overutilization of resources to support lingering inactive sessions.

SUMMARY

In light of the foregoing background, the following presents a simplified summary of autonomic virtual machine session lingering in order to provide a basic understanding of some aspects described herein. This summary is not an extensive overview, and it is not intended to identify key or critical elements or to delineate the scope of the claims. The following summary merely presents various described aspects in a simplified form as a prelude to the more detailed description provided below.

According to one or more aspects described herein, virtual machine sessions may be hosted by a virtualization computing platform. A portion of the virtual machine sessions that are inactive may be identified. The virtualization computing platform may continue to host the virtual machine sessions that are inactive. A determination may be made that utilization of one or more resources associated with the virtualization computing platform exceeds a threshold. Responsive to determining that utilization of the one or more resources associated with the virtualization computing platform exceeds the threshold, the virtualization computing platform may cease to host one or more of the portion of virtual machine sessions that are inactive.

In some embodiments, the portion of virtual machine sessions that are inactive may include a virtual machine session that was disconnected from a client agent application with which the virtual machine session was previously connected. A request to connect to a virtual machine session may be received from the client agent application. The client agent application may be reconnected with the virtual machine session that was disconnected from the client agent application. The virtual machine session that was disconnected from the client agent application may have been continually hosted by the virtualization computing platform since being disconnected from the client agent application.

In some embodiments, the portion of virtual machine sessions that are inactive may include a virtual machine session associated with a user account. The virtual machine session associated with the user account may be configured to support one or more applications, at least one of which may have previously been open within the virtual machine session associated with the user account. A request associated with the user account may be received from a client agent application. The virtual machine session associated with the user account may be identified from among the portion of virtual machine sessions that are inactive. At least one of the supported applications may be opened (or reopened) within the virtual machine session associated with the user account. The client agent application may be connected with the virtual machine session associated with the user account. The virtual machine session associated with the user account may have been continually hosted by the virtualization computing platform since the at least one of the supported application(s) previously open within the virtual machine session associated with the user account was closed.

In some embodiments, the virtualization computing platform may include multiple virtual computing environments. Each of the virtual computing environments may be configured to host a plurality of virtual machine sessions. Determining that utilization of the one or more resources associated with the virtualization computing platform exceeds the threshold may include determining by at least one of the virtual computing environments that utilization of one or more resources associated with the at least one of the virtual computing environments exceeds a threshold associated with the at least one of the virtual computing environments. Ceasing to continue to host the one or more of the portion of virtual machine sessions that are inactive may include ceasing to host one or more virtual machine sessions that the at least one of the virtual computing environments is continuing to host.

In some embodiments, the virtual computing environments may include a first portion of virtual computing environments associated with a first supported application and a second portion of virtual computing environments associated with a second supported application. The second supported application may be a different application from the first supported application. Determining that utilization of the one or more resources associated with the virtualization computing platform exceeds the threshold may include determining by a virtual computing environment of the virtual computing environments that utilization of one or more resources associated with either the first portion of virtual computing environments or the second portion of virtual computing environments exceeds a threshold associated with the either first portion of virtual computing environments or the second portion of virtual computing environments. Ceasing to continue to host the one or more of the portion of virtual machine sessions that are inactive may include ceasing to host one or more virtual machine sessions that the either first portion of virtual computing environments is continuing to host or the second portion of virtual computing environments is continuing to host. The virtual computing environment may be a virtual computing environment distinct from the first portion of virtual computing environments and the second portion of virtual computing environments.

In some embodiments, determining that utilization of the one or more resources associated with the virtualization computing platform exceeds the threshold may include determining that at least one of memory utilization exceeds the predetermined threshold, disk communication utilization exceeds the predetermined threshold, or a number of the portion of virtual machine sessions that are inactive exceeds the predetermined threshold. In some embodiments, prior to ceasing to continue to host the one or more of the portion of virtual machine sessions that are inactive, one or more of the portion of virtual machine sessions may be identified based on a likelihood that the one or more of the portion of virtual machine sessions will be utilized again in the future. Identifying the one or more of the portion of virtual machine sessions based on the likelihood that the one or more of the portion of virtual machine sessions will be utilized again in the future may include determining that the one or more of the portion of virtual machine sessions are less likely to be utilized again in the future than other virtual machine sessions of the portion of virtual machine sessions.

In some embodiments, the likelihood that the one or more of the portion of virtual machine sessions will be utilized again in the future may be determined based on an amount of time since the one or more of the portion of virtual machine sessions were last utilized, a time of day when the one or more of the portion of virtual machine sessions were last utilized, and/or one or more geographic locations associated with one or more client agent applications that were last connected to the one or more of the portion of virtual machine sessions.

In some embodiments, the one or more of the portion of virtual machine sessions may comprise one or more supported applications that were previously open within the one or more of the portion of virtual machine sessions, and the likelihood that the one or more of the portion of virtual machine sessions will be utilized again in the future may be determined based on a priority level associated with the one or more supported applications that were previously open within the one or more of the portion of virtual machine sessions. Additionally or alternatively, the one or more of the portion of virtual machine sessions may be associated with one or more user accounts, and the likelihood that the one or more of the portion of virtual machine sessions will be utilized again in the future may be determined based on a priority level associated with the one or more user accounts and/or on one or more historical usage trends associated with the one or more user accounts.

BRIEF DESCRIPTION OF THE DRAWINGS

Figure 1:
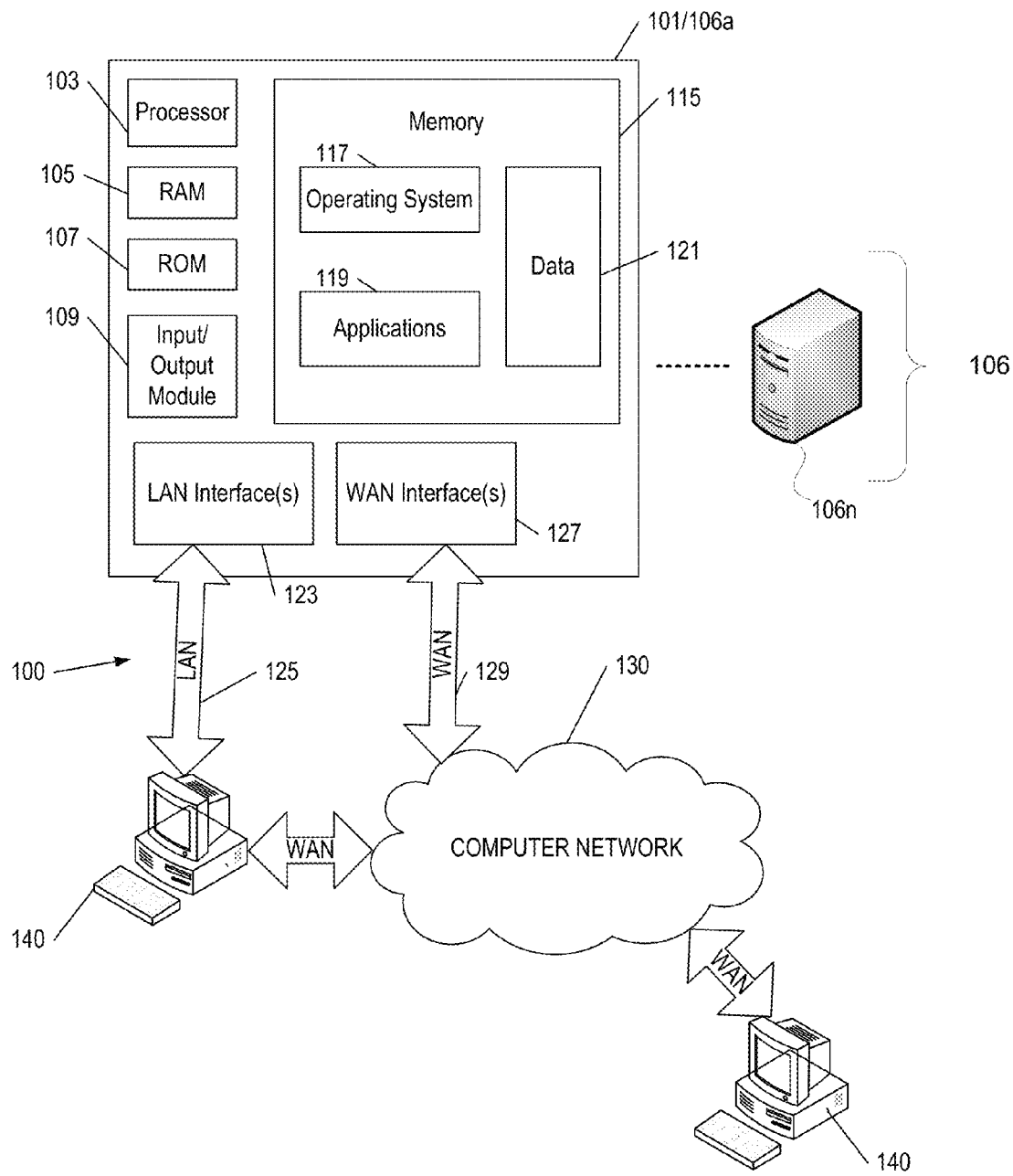
Figure 2:
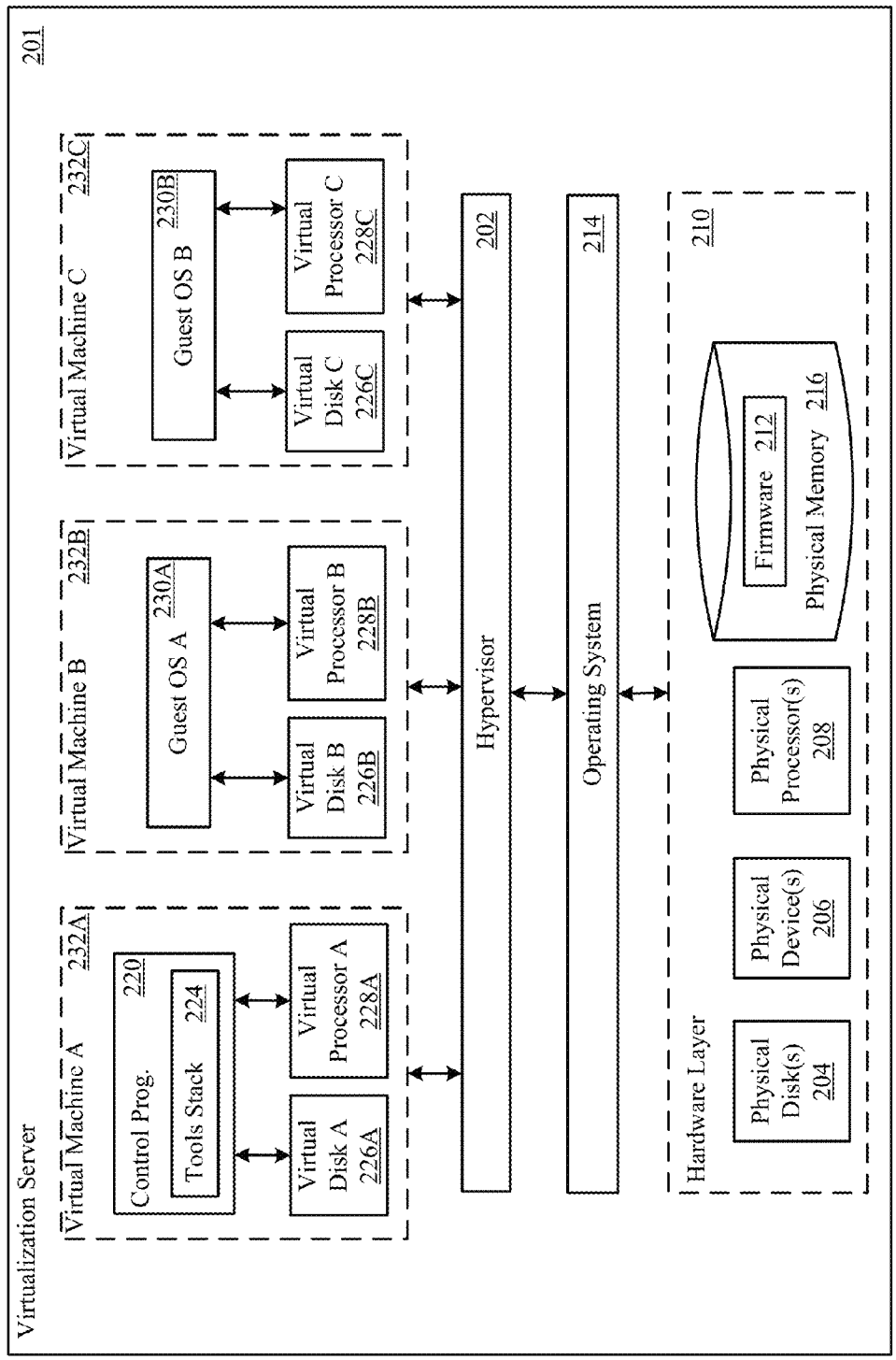
Figure 3:
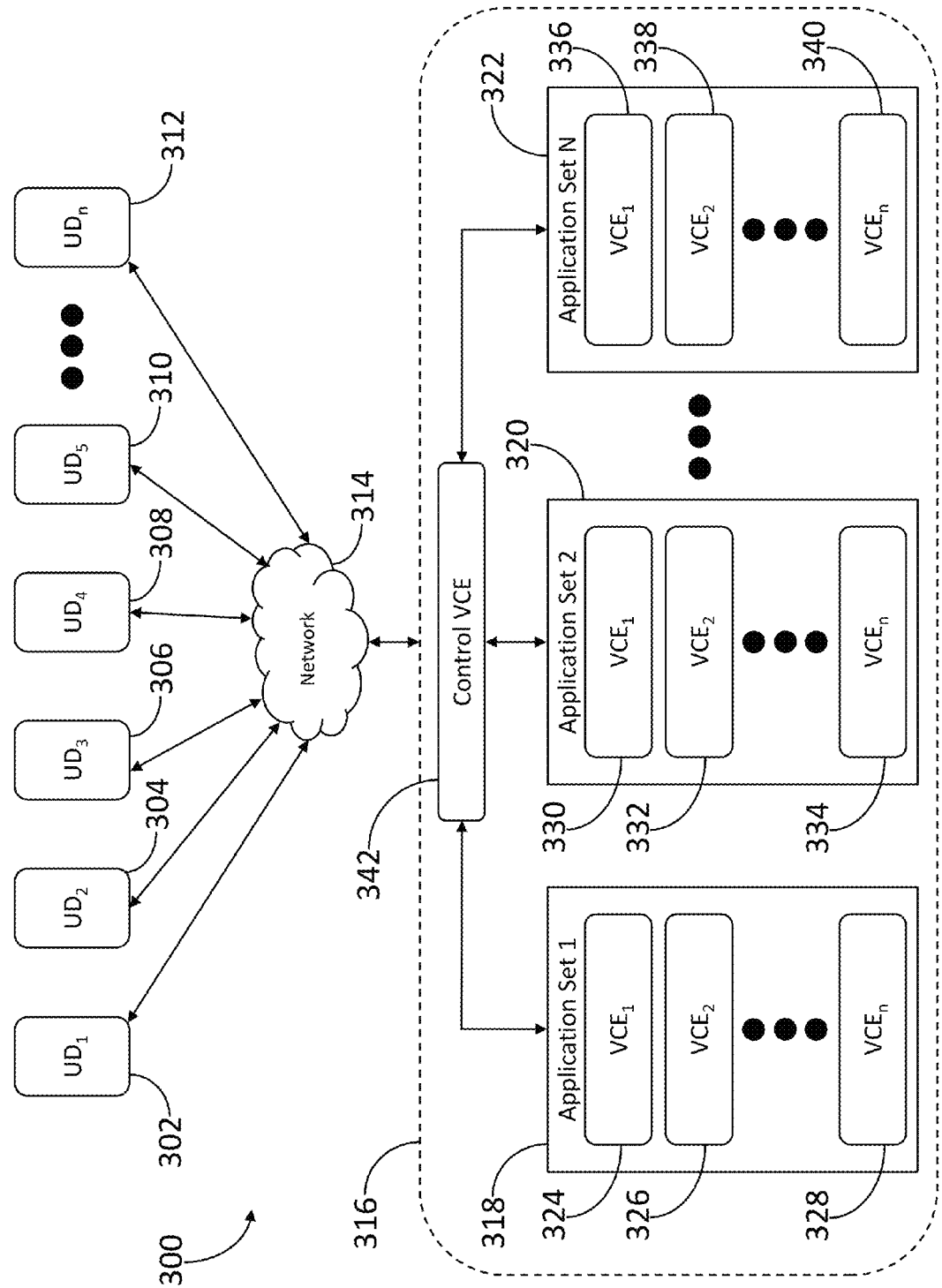
Figure 4:
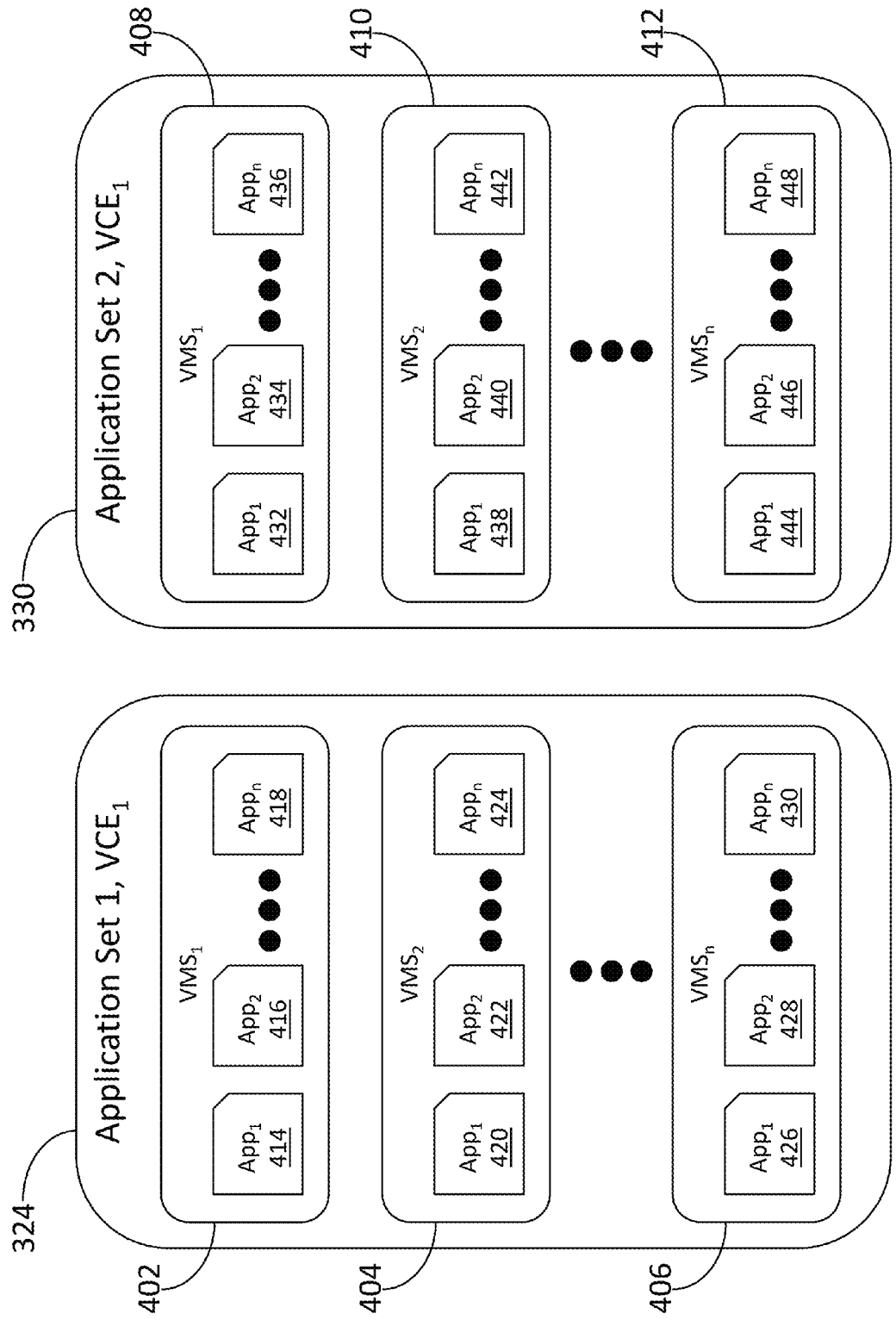
Figure 5B:
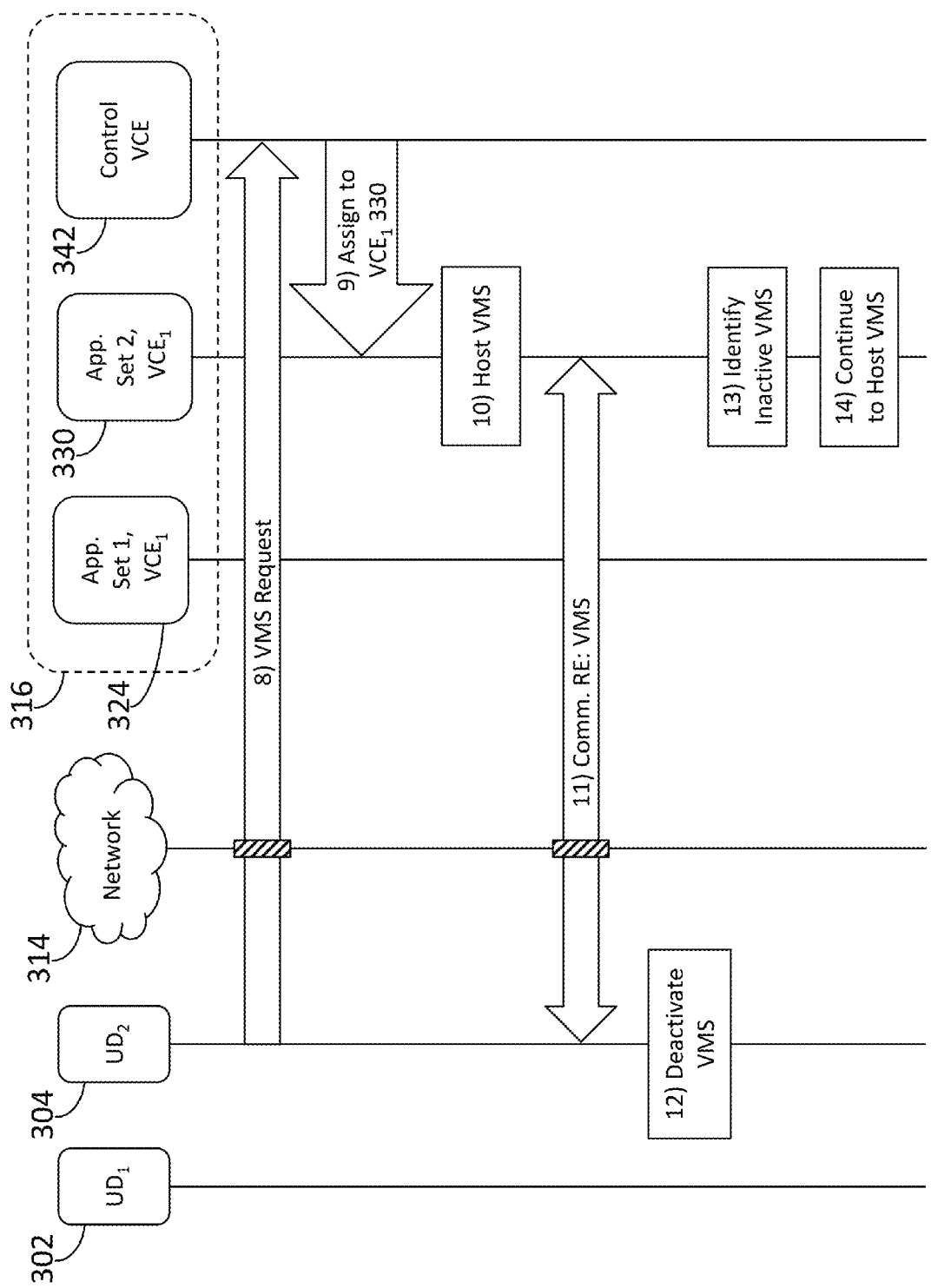
Figure 5D:
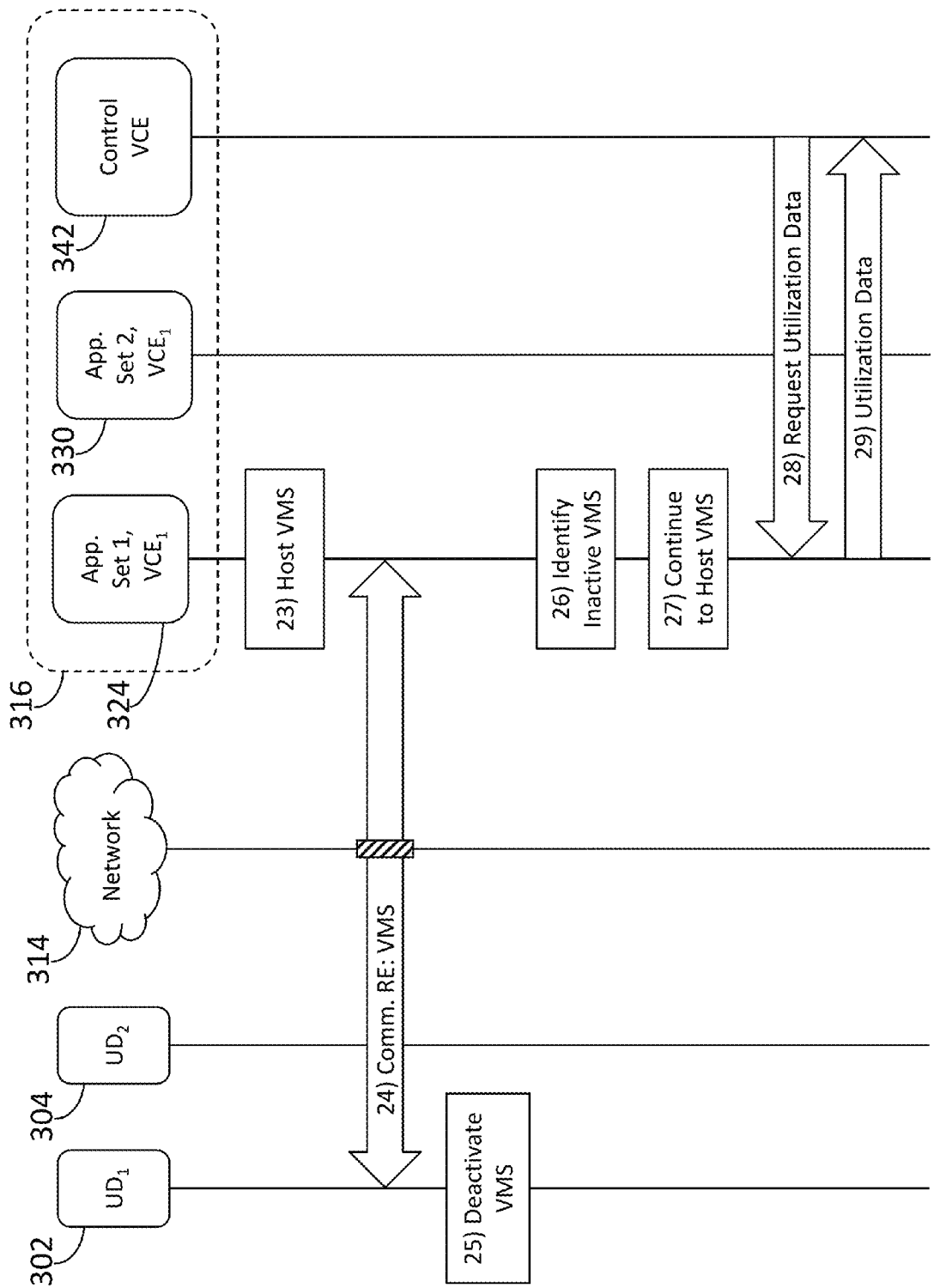
Figure 5F:
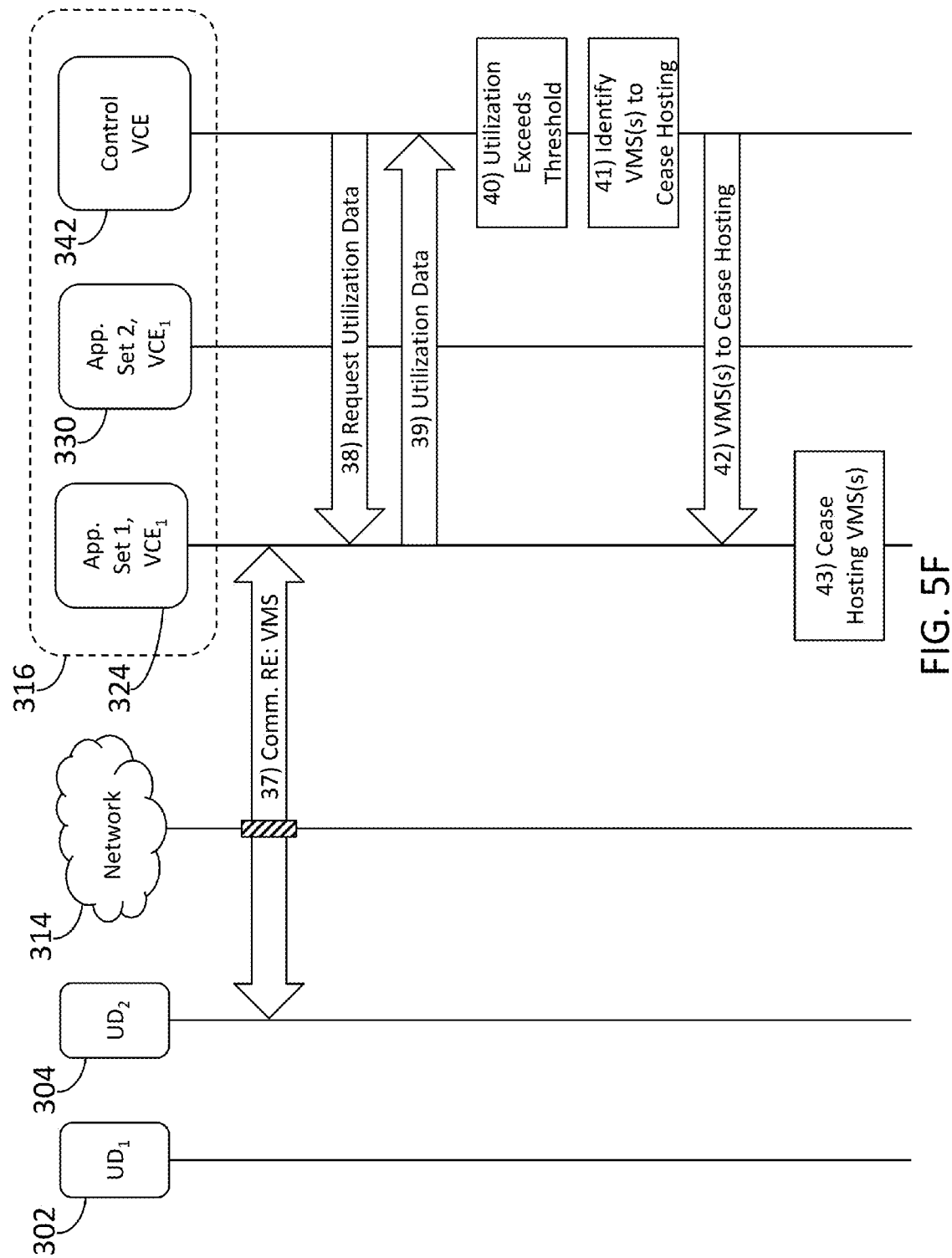
Figure 6:
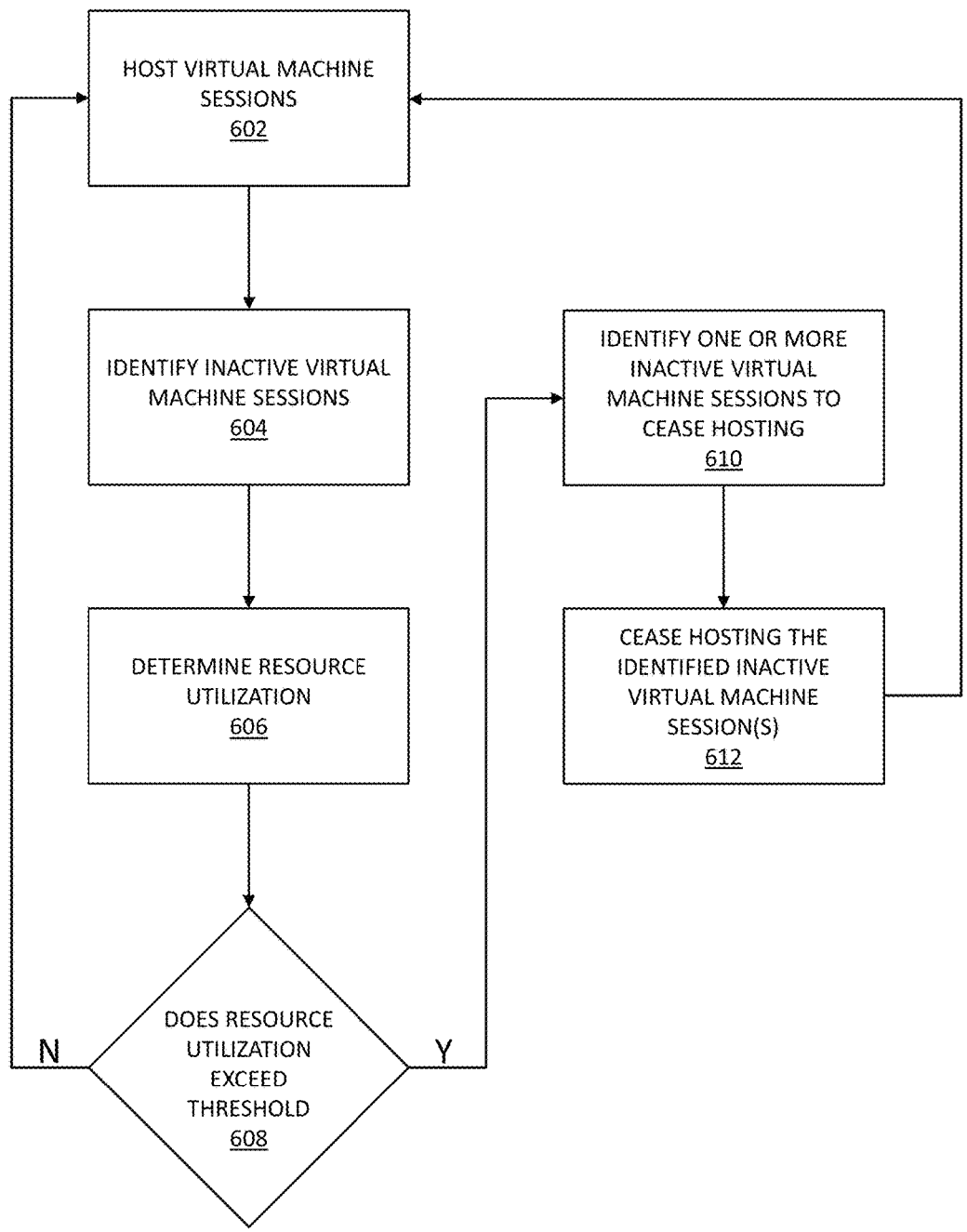

Having thus described aspects of the disclosure in general terms, reference will now be made to the accompanying drawings, which are not necessarily drawn to scale, and wherein:

FIG. 1 depicts an example operating environment in which various aspects of the disclosure may be implemented;

FIG. 2 depicts example embodiments of a virtualization server in accordance with one or more illustrative aspects described herein;

FIG. 3 depicts an example computing environment for autonomic virtual machine session lingering in accordance with one or more illustrative aspects described herein;

FIG. 4 depicts example virtual computing environments for autonomic virtual machine session lingering in accordance with one or more illustrative aspects described herein;

FIGS. 5A-5F depict an example event flow of autonomic virtual machine session lingering in accordance with one or more illustrative aspects described herein; and FIG. 6 depicts an example method for autonomic virtual machine session lingering in accordance with one or more illustrative aspects described herein.

DETAILED DESCRIPTION

In the following description of various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system (e.g., a cloud system) configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client or user devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiments be referred to as a single client machine 140 or a single group of client machines 140, while server(s) 106 may be referred to as a single server 106 or a single group of servers 106. In one embodiment, a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); user device(s); local machine; remote machine; client node(s); endpoint(s); or endpoint node(s). The server 106, in some embodiments, may be referenced by any one of the following terms: server(s), local machine; remote machine; server farm(s), or host computing device(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

Still other embodiments include a client device 140 that displays application output generated by an application remotely executing on a server 106 or other remotely located machine. In these embodiments, the client device 140 may execute a client agent application to display the output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106a-106n such that the servers 106a-106n are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106a-106n within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS, manufactured by Microsoft Corp. of Redmond, Wash., UNIX, LINUX, or MAC OS). In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. Some embodiments include a first server 106a that receives requests from a client machine 140, forwards the request to a second server 106n, and responds to the request generated by the client machine 140 with a response from the second server 106n. The first server 106a can acquire an enumeration of applications available to the client machine 140 as well as address information associated with an application server 106 hosting an application identified within the enumeration of applications. The first server 106a can then present a response to the client's request using a web interface, and communicate directly with the client 140 to provide the client 140 with access to an identified application.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments may include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include but are not limited to: a bus network topology; a star network topology; a ring network topology; a repeater-based network topology; or a tiered-star network topology. Additional embodiments may include a network of mobile telephone networks that use a protocol to communicate among mobile devices, where the protocol may include, but is not limited to: AMPS; TDMA; CDMA; GSM; GPRS UMTS; or any other protocol able to transmit data among mobile devices.

FIG. 1 shows a high-level architecture of an illustrative desktop virtualization system. As shown, the desktop virtualization system may be a single-server, multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Illustrated in FIG. 2 is one embodiment of a computer device 201 configured as a virtualization server in a virtualization environment, for example, a single-server, multi-server, or cloud computing environment. The virtualization server 201 illustrated in FIG. 2 can be deployed as and/or implemented by one or more embodiments of the server 106 illustrated in FIG. 1 or by other known computing devices. Included in virtualization server 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The virtualization server 201 may further include an operating system 214 that may be stored in a memory element in the physical memory 216 and executed by one or more of the physical processors 208. Still further, a hypervisor 402 may be stored in a memory element in the physical memory 216 and can be executed by one or more of the physical processors 208. Executing on one or more of the physical processors 208 may be one or more virtual machines 232A-C (generally 232). Each virtual machine 232 may have a virtual disk 226A-C and a virtual processor 228A-C. In some embodiments, a first virtual machine 232A may execute, on a virtual processor 228A, a control program 220 that includes a tools stack 224. In other embodiments, one or more virtual machines 232B-C may be executed, on a virtual processor 228B-C, a guest operating system 230A-B.

Further referring to FIG. 2, and in more detail, the virtualization server 201 may include a hardware layer 210 with one or more pieces of hardware that communicate with the virtualization server 201. In some embodiments, the hardware layer 210 can include one or more physical disks 204, one or more physical devices 206, one or more physical processors 208, and one or more memory 216. Physical components 204, 206, 208, and 216 may include, for example, any of the components described above with respect to FIG. 1. For instance, physical disks 204 may include permanent memory storage, temporary memory storage, disk drives (e.g., optical, floppy, tape), hard disks, external hard drives, flash memory, network-attached storage, a storage-area network, or any other storage repository that the virtualization server 201 can access. Physical devices 206 may include any device included in the virtualization server 201 and/or any combination of devices included in the virtualization server 201 and external devices that communicate with the virtualization server 201. A physical device 206 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 201. The physical memory 216 in the hardware layer 210 may include any type of memory. The physical memory 216 may store data, and in some embodiments may store one or more programs, or set of executable instructions. FIG. 2 illustrates an embodiment where firmware 212 is stored within the physical memory 216 of the virtualization server 201. Programs or executable instructions stored in the physical memory 216 can be executed by the one or more processors 208 of the virtualization server 201.

Virtualization server 201 may also include a hypervisor 202. In some embodiments, hypervisor 202 may be a program executed by processors 208 on the virtualization server 201 to create and manage any number of virtual machines 232. The hypervisor 202 can be referred to as a virtual machine monitor, or platform virtualization software. In some embodiments, a hypervisor 202 can be any combination of executable instructions and hardware that monitors virtual machines executing on a computing machine. Hypervisor 202 may be a Type 2 hypervisor, or a hypervisor that executes within an operating system 214 executing on the virtualization server 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 201 in a virtualization environment may include a Type 1 hypervisor (Not Shown). A Type 1 hypervisor may execute on the virtualization server 201 by directly accessing the hardware and resources within the hardware layer 210. That is, while a Type 2 hypervisor 202 accesses system resources through a host operating system 214, a Type 1 hypervisor may directly access all system resources without needing a host operating system 214. A Type 1 hypervisor may execute directly on one or more physical processors 208 of the virtualization server 201, and may include program data stored in the physical memory 216.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices 206; physical disks; physical processors; physical memory 216 and any other component included in the virtualization server 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the virtualization server 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 201 executes a hypervisor 202 that creates a virtual machine platform on which guest operating systems may execute. In these embodiments, the virtualization server 201 can be referred to as a host server. An example of such a virtualization server is the XEN SERVER provided by Citrix Systems, Inc., of Fort Lauderdale, Fla.

The hypervisor 202 may create one or more virtual machines 232B-C (generally 232) in which guest operating systems 230 execute. In some embodiments, the hypervisor 202 may load a virtual machine image to create a virtual machine 232. In other embodiments, the hypervisor 202 may execute a guest operating system 230 within the virtual machine 232. In still other embodiments, the virtual machine 232 may execute the guest operating system 230.

In addition to creating virtual machines 232, the hypervisor 202 may control the execution of at least one virtual machine 232. In other embodiments, the hypervisor 202 may present at least one virtual machine 232 with an abstraction of at least one hardware resource provided by the virtualization server 201 (e.g., any hardware resource available within the hardware layer 210). In other embodiments, the hypervisor 202 may control the manner in which virtual machines 232 access the physical processors 208 available in the virtualization server 201. Controlling access to the physical processors 208 may include determining whether a virtual machine 232 should have access to a processor 208, and how physical processor capabilities are presented to the virtual machine 232.

As shown in the example of FIG. 2, the virtualization server 201 may host or execute one or more virtual machines 232. A virtual machine 232 is a set of executable instructions that, when executed by a processor 208, imitate the operation of a physical computer such that the virtual machine 232 can execute programs and processes much like a physical computing device. While FIG. 2 illustrates an embodiment where a virtualization server 201 hosts three virtual machines 232, in other embodiments, the virtualization server 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 202 may create one or more unsecure virtual machines 232 and one or more secure virtual machines 232. Unsecure virtual machines 232 may be prevented from accessing resources, hardware, memory locations, and programs that secure virtual machines 232 may be permitted to access. In other embodiments, the hypervisor 202 may provide each virtual machine 232 with a substantially similar virtual view of the physical hardware, memory, processor and other system resources available to the virtual machines 232.

Each virtual machine 232 may include a virtual disk 226A-C (generally 226) and a virtual processor 228A-C (generally 228.) The virtual disk 226, in some embodiments, is a virtualized view of one or more physical disks 204 of the virtualization server 201, or a portion of one or more physical disks 204 of the virtualization server 201. The virtualized view of the physical disks 204 can be generated, provided, and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the virtualization server 201. In some embodiments, the virtualized view of the physical processors 208 can be generated, provided, and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

FIG. 3 depicts an example computing environment for autonomic virtual machine session lingering in accordance with one or more illustrative aspects described herein. Referring to FIG. 3, computing environment 300 may include user devices 302, 304, 306, 308, 310, and 312. Two or more of user devices 302, 304, 306, 308, 310, and 312 may be interconnected via network 314, or a portion thereof. Network 314 may comprise one or more component networks (e.g., LANs, WANs, VLANs, etc.). Computing environment 300 may also include virtualization computing platform 316. One or more of user devices 302, 304, 306, 308, 310, and 312 may be connected to virtualization computing platform 316 via network 314, or a portion thereof.

Virtualization computing platform 316 may comprise one or more resources, any portion of which may be geographically concentrated or dispersed as desired. In some embodiments, one or more resources of virtualization computing platform 316 may be grouped based on one or more applications they support. For example, virtualization computing platform 316 may include resource sets 318, 320, and 322. Resource set 318 may include one or more resources of virtualization computing platform 316 that support one or more particular applications offered by virtualization computing platform 316. Similarly, resources sets 320 and 322 may include one or more resources of virtualization computing platform 316 that support one or more other applications offered by virtualization computing platform 316.

One or more of resource sets 318, 320, and 322 may include one or more resources (e.g., hardware resources, software resources, firmware resources, network resources, or the like, such as those described above with respect to FIGS. 1 and 2) utilized to create and/or host a plurality of virtual computing environments. For example, resource set 318 may include one or more resources utilized to create and/or host virtual computing environments 324, 326, and 328. Similarly, resource set 320 may include one or more resources utilized to create and/or host virtual computing environments 330, 332, and 334; and resource set 322 may include one or more resources utilized to create and/or host virtual computing environments 336, 338, and 340. Virtual computing environments 324, 326, 328, 330, 332, 334, 336, 338, and 340 may be virtualized instances of computing environments (e.g., MICROSOFT WINDOWS SERVER) configured for hosting one or more virtual machine sessions (e.g., virtual desktops) for utilization by one or more users.

FIG. 4 depicts example virtual computing environments for autonomic virtual machine session lingering in accordance with one or more illustrative aspects described herein. Referring to FIG. 4, as indicated above, virtual computing environment 324 may host one or more virtual machine sessions. For example, virtual computing environment 324 may host virtual machine sessions 402, 404, and 406. Similarly, virtual computing environment 330 may host virtual machine sessions 408, 410, and 412. A virtual machine session (e.g., a virtual desktop) may be configured to support and/or execute one or more applications. For example, virtual machine session 402 may be configured to support and/or execute applications 414, 416, and 418. Similarly, virtual machine session 404 may be configured to support and/or execute applications 420, 422, and 424; virtual machine session 406 may be configured to support and/or execute applications 426, 428, and 430; virtual machine session 408 may be configured to support and/or execute applications 432, 434, and 436; virtual machine session 410 may be configured to support and/or execute applications 438, 440, and 442; and virtual machine session 412 may be configured to support and/or execute applications 444, 446, and 448.

As indicated above, resource set 318 may include one or more resources of virtualization computing platform 316 that support one or more particular applications offered by virtualization computing platform 316, and resource set 320 may include one or more resources of virtualization computing platform 316 that support other applications offered by virtualization computing platform 316. For example, applications 414, 416, 418, 420, 422, 424, 426, 428, and 430 may be instances of one or more applications supported by resource set 318 (e.g., via virtual computing environment 324) and applications 432, 434, 436, 438, 440, 442, 444, 446, and 448 may be instances of one or more applications supported by resource set 320 (e.g., via virtual computing environment 330).

Referring to FIG. 3, one or more of user devices 302, 304, 306, 308, 310, and 312 may be a computing platform configured to provide a user with access to a virtual machine session hosted by one or more of virtual computing environments 324, 326, 328, 330, 332, 334, 336, 338, and 340. In some embodiments, one or more of user devices 302, 304, 306, 308, 310, and 312 may be a desktop computer, laptop computer, mobile device, or the like (e.g., tablet device, smart phone, personal media device, etc.) configured to provide a user with access to a virtual machine session. For example, user device 302 may be a computer configured to provide a user with access to a virtual machine session hosted by virtual computing environment 324. Access to such a virtual machine session may be provided via a client agent application. The client agent application may be a platform-specific or platform-agnostic application executed by the user device. For example, the client agent application may be a software application executing on a client device (e.g., user device 302) that facilitates communications with remote resources and/or virtualized resources (e.g., resources of virtualization computing platform 316). In one illustrative embodiment, the client agent application may be RECEIVER by Citrix Systems, Inc. of Fort Lauderdale, Fla. In some embodiments, the client agent application may be executed as part of a web-browser or web-browser plugin executed by the user device. The client agent application may provide the user with a view (e.g., a virtual or remote desktop) of a computing environment (e.g., a virtual machine session) created by and executed on a computing platform distinct from the user device. For example, a client agent application executed by user device 302 may provide a user of user device 302 with a view of a virtual machine session hosted by virtual computing environment 324 (e.g., virtual machine session 402).

In some embodiments, virtualization computing platform 316 may include control virtual computing environment 342. Control virtual computing environment 342 may be configured to utilize one or more performance metrics, parameters, or the like to allocate (e.g., load balance) resources of virtualization computing platform 316 (e.g., resources associated with resource sets 318, 320, and 322) to one or more tasks virtualization computing platform 316 is handling at a particular time (e.g., tasks associated with creating and/or hosting one or more virtual machine sessions). For example, prior to a time illustrated by FIG. 4, control virtual computing environment 342 may have utilized one or more performance metrics, parameters, or the like to allocate creation and/or hosting of virtual machine sessions 402, 404, and 406 to resource set 318 (e.g., to virtual computing environment 324), and to allocate creation and/or hosting of virtual machine sessions 408, 410, and 412 to resource set 320 (e.g., to virtual computing environment 330).

As will be described in greater detail below, in accordance with one or more embodiments, a virtualization computing platform may host a plurality of virtual machine sessions. For example, virtualization computing platform 316 may host virtual machine sessions 402, 404, 406, 408, 410, and 412 (e.g., via virtual computing environments 324 and 330). A portion of virtual machine sessions that are inactive may be identified from among the plurality of virtual machine sessions. For example, virtualization computing platform 316 may identify virtual machine sessions 404, 406, 410, and 412 as inactive (e.g., as having been disconnected from a client agent application with which they were previously connected and/or as comprising one or more closed applications that were previously open). The virtualization computing platform may continue to host the portion of virtual machine sessions. For example, virtualization computing platform 316 may continue to host virtual machine sessions 404 and 406 via virtual computing environment 324 and virtual machine sessions 410 and 412 via virtual computing environment 330. These hosted inactive virtual machine sessions may be referred to as "lingering."

A determination may be made that utilization of one or more resources associated with the virtualization computing platform exceeds a threshold. For example, virtualization computing platform 316 may determine that utilization of one or more resources (e.g., memory utilization, disk communication utilization, or a number of the portion of virtual machine sessions that are inactive) associated with virtualization computing platform 316 (or a portion thereof) exceeds a predetermined threshold. Responsive to determining that utilization of the one or more resources associated with the virtualization computing platform exceeds the predetermined threshold, the virtualization computing platform may cease to continue to host one or more of the portion of virtual machine sessions that are inactive. For example, responsive to determining that utilization of the one or more resources associated with virtualization computing platform 316 (or the portion thereof) exceeds the predetermined threshold, virtualization computing platform 316 may cease to host one or more of the portion of virtual machine sessions that are inactive (e.g., one or more of virtual machine sessions 404, 406, 410, and 412).

FIGS. 5A-5F depict an example event flow of autonomic virtual machine session lingering in accordance with one or more illustrative aspects described herein. Referring to FIG. 5A, at step 1, user device 302 may communicate a virtual machine session request to virtualization computing platform 316. For example, a user of user device 302 may have requested an application supported by resource set 318 via a client agent application executing on user device 302, and the client agent application may have generated a request for a corresponding virtual machine session and communicated that request to virtualization computing platform 316. The request may be received and/or processed by control virtual computing environment 342. At step 2, control virtual computing environment 342 may assign the virtual machine session request to one or more resource sets and/or one or more virtual computing environments based on one or more performance metrics, parameters, or the like. For example, control virtual computing environment 342 may assign the request to virtual computing environment 324 (e.g., based in part on the request being for an application supported by resource set 318). At step 3, virtual computing environment 324 may host a virtual machine session comprising the requested application. For example, virtual computing environment 324 may instantiate virtual machine session 402 (e.g., a virtual desktop) configured to support the requested application, may execute the requested application (e.g., application 414) within virtual machine session 402, and may provide a user of user device 302 with a view of the virtual machine session and/or the requested application executing therein (e.g., via a client agent application executing on user device 302). At step 4, user device 302 and virtualization computing platform 316 may exchange a variety of communications regarding virtual machine session 402 (e.g., input received by user device 302 that pertains to virtual machine session 402, output generated by virtualization computing platform 316 that pertains to virtual machine session 402, performance parameters, keep alive communications, and the like).

At step 5, an event associated with user device 302 may occur that deactivates virtual machine session 402. For example, a client agent application executing on user device 302 may become disconnected from virtualization computing platform 316 (e.g., as a result of a network connectivity issue), or a user of user device 302 may close application 414. At step 6, virtualization computing platform 316 may identify virtual machine session 402 as inactive. For example, virtualization computing platform 316 may determine that user device 302 (or a client agent application executing thereon) has been disconnected from virtual machine session 402 or that virtual machine session 402 comprises one or more closed applications that were previously open within virtual machine session 402. In some embodiments, a virtual machine session may be identified as inactive by the virtual computing environment hosting the virtual machine session. For example, virtual machine session 402 may be identified as inactive by virtual computing environment 324. Additionally or alternatively, a virtual machine session may be identified as inactive by a virtual computing environment distinct from the virtual computing environment hosting the virtual machine session. For example, virtual machine session 402 may be identified as inactive by control virtual computing environment 342. At step 7, virtualization computing platform 316 may continue to host virtual machine session 402 (e.g., via virtual computing environment 324) despite having identified virtual machine session 402 as inactive.

Referring to FIG. 5B, at step 8, user device 304 may communicate a virtual machine session request to virtualization computing platform 316. For example, a user of user device 304 may have requested an application supported by resource set 320 via a client agent application executing on user device 304, and the client agent application may have generated a request for a corresponding virtual machine session and communicated that request to virtualization computing platform 316. The request may be received and/or processed by control virtual computing environment 342. At step 9, control virtual computing environment 342 may assign the virtual machine session request to one or more resource sets and/or one or more virtual computing environments based on one or more performance metrics, parameters, or the like. For example, control virtual computing environment 342 may assign the request to virtual computing environment 330 (e.g., based in part on the request being for an application supported by resource set 320). At step 10, virtual computing environment 330 may host a virtual machine session comprising the requested application. For example, virtual computing environment 330 may instantiate virtual machine session 408 (e.g., a virtual desktop) configured to support the requested application, may execute the requested application (e.g., application 432) within virtual machine session 408, and may provide a user of user device 304 with a view of the virtual machine session and/or the requested application executing therein (e.g., via a client agent application executing on user device 304). At step 11, user device 304 and virtualization computing platform 316 may exchange a variety of communications regarding virtual machine session 408 (e.g., input received by user device 304 that pertains to virtual machine session 408, output generated by virtualization computing platform 316 that pertains to virtual machine session 408, performance parameters, keep alive communications, and the like).

At step 12, an event associated with user device 304 may occur that deactivates virtual machine session 408. For example, a client agent application executing on user device 304 may become disconnected from virtualization computing platform 316 (e.g., as a result of a network connectivity issue), or a user of user device 304 may close application 432. At step 13, virtualization computing platform 316 may identify virtual machine session 408 as inactive. For example, virtualization computing platform 316 may determine that user device 304 (or a client agent application executing thereon) has been disconnected from virtual machine session 408 or that virtual machine session 408 comprises one or more closed applications that were previously open within virtual machine session 408. At step 14, virtualization computing platform 316 may continue to host virtual machine session 408 (e.g., via virtual computing environment 330) despite having identified virtual machine session 408 as inactive.

Referring to FIG. 5C, at step 15, control virtual computing environment 342 may request utilization data (e.g., memory utilization data, disk communication utilization data, and/or a number of virtual machine sessions that are inactive) from virtual computing environment 324. At step 16, virtual computing environment 324 may communicate the requested utilization data to control virtual computing environment 342. At step 17, control virtual computing environment 342 may compare the received utilization data (or one or more values derived therefrom) to a threshold, and may determine that utilization of one or more resources associated with virtualization computing platform 316 is within the threshold (e.g., that virtual computing environment 324 is hosting an acceptable number of inactive virtual machine sessions). In some embodiments, the utilization data and/or the threshold may be associated with virtualization computing platform 316 as a whole, a particular resource set of virtualization computing platform 316 (e.g., resource set 318), and/or a particular virtual computing environment (e.g., virtual computing environment 324). For example, the utilization data may be associated with virtual computing environment 324, and control virtual computing environment 342 may compare the utilization data with a threshold associated with virtual computing environment 324, and may determine that the utilization data is within the threshold. Additionally or alternatively, the utilization data and/or the threshold may be associated with overall utilization of virtualization computing platform 316, overall utilization of a particular resource set of virtualization computing platform 316 (e.g., resource set 318), and/or overall utilization of a particular virtual computing environment (e.g., virtual computing environment 324); or the utilization data and/or the threshold may be associated with utilization of virtualization computing platform 316 associated with hosting one or more virtual machine sessions identified as inactive, utilization of a particular resource set of virtualization computing platform 316 (e.g., resource set 318) associated with hosting one or more virtual machine sessions identified as inactive, and/or utilization of a particular virtual computing environment (e.g., virtual computing environment 324) associated with hosting one or more virtual machine sessions identified as inactive.

Similarly, at step 18, control virtual computing environment 342 may request utilization data from virtual computing environment 330. At step 19, virtual computing environment 330 may communicate the requested utilization data to control virtual computing environment 342. In some embodiments, utilization data may not be requested or "polled" for (e.g., by control virtual computing environment 342). For example, virtual computing environment 324 and/or virtual computing environment 330 may be configured to provide or "push" utilization data to control virtual computing environment 342 (e.g., on a periodic basis and/or in response to a change in utilization of a pre-determined magnitude). At step 20, control virtual computing environment 342 may compare the received utilization data (or one or more values derived therefrom) to a threshold, and may determine that utilization of one or more resources associated with virtualization computing platform 316 is within the threshold. For example, the utilization data may be associated with virtual computing environment 330, and control virtual computing environment 342 may compare the utilization data with a threshold associated with virtual computing environment 330, and may determine that the utilization data is within the threshold (e.g., that virtual computing environment 330 is hosting an acceptable number of inactive virtual machine sessions).

At step 21, user device 302 may communicate a virtual machine session request to virtualization computing platform 316. For example, a user of user device 302 may have requested an application supported by resource set 318 via a client agent application executing on user device 302, and the client agent application may have generated a request for a corresponding virtual machine session and communicated that request to virtualization computing platform 316. The request may be received and/or processed by control virtual computing environment 342. At step 22, control virtual computing environment 342 may assign the virtual machine session request to one or more resource sets and/or one or more virtual computing environments based on one or more performance metrics, parameters, or the like. For example, based on virtual machine session 402 having been previously identified as inactive but having continued to be hosted by virtual computing environment 324 despite having been identified as inactive, control virtual computing environment 342 may assign the request to virtual computing environment 324. Referring to FIG. 5D, at step 23, virtual computing environment 324 may host a virtual machine session comprising the requested application. For example, virtual computing environment 324 may identify virtual machine session 402 as configured to support the requested application, may execute the requested application (e.g., application 414) within virtual machine session 402, and may provide a user of user device 302 with a view of the virtual machine session and/or the requested application executing therein (e.g., via a client agent application executing on user device 302). The time required to fulfill the request may be reduced by the overhead startup time associated with instantiating a new virtual machine session due to virtual computing environment 324 utilizing virtual machine session 402, which, as indicated above, virtual computing environment 324 may have continued to host despite its having been identified as inactive. In some embodiments, virtual machine session 402 may be identified based on its prior utilization by the user of user device 302 (e.g., associated with steps 1-4), which may further reduce the time required to fulfill the request (e.g., virtual machine session 402 may already be configured with profile information, authentication credentials, security tokens, or the like associated with the user of user device 302).

At step 24, user device 302 and virtualization computing platform 316 may exchange a variety of communications regarding virtual machine session 402 (e.g., input received by user device 302 that pertains to virtual machine session 402, output generated by virtualization computing platform 316 that pertains to virtual machine session 402, performance parameters, keep alive communications, and the like). At step 25, an event associated with user device 302 may occur that deactivates virtual machine session 402. For example, a client agent application executing on user device 302 may become disconnected from virtualization computing platform 316 (e.g., as a result of a network connectivity issue), or a user of user device 302 may close application 414. At step 26, virtualization computing platform 316 may identify virtual machine session 402 as inactive. For example, virtualization computing platform 316 may determine that user device 302 (or a client agent application executing thereon) has been disconnected from virtual machine session 402 or that virtual machine session 402 comprises one or more closed applications that were previously open within virtual machine session 402. At step 27, virtualization computing platform 316 may continue to host virtual machine session 402 (e.g., via virtual computing environment 324) despite having identified virtual machine session 402 as inactive.

At step 28, control virtual computing environment 342 may request utilization data (e.g., memory utilization data, disk communication utilization data, and/or a number of virtual machine sessions that are inactive) from virtual computing environment 324. At step 29, virtual computing environment 324 may communicate the requested utilization data to control virtual computing environment 342. Referring to FIG. 5E, at step 30, control virtual computing environment 342 may compare the received utilization data (or one or more values derived therefrom) to a threshold, and may determine that utilization of one or more resources associated with virtualization computing platform 316 is within the threshold (e.g., that virtual computing environment 324 is hosting an acceptable number of inactive virtual machine sessions). For example, the utilization data may be associated with virtual computing environment 324, and control virtual computing environment 342 may compare the utilization data with a threshold associated with virtual computing environment 324, and may determine that the utilization data is within the threshold. Similarly, at step 31, control virtual computing environment 342 may request utilization data from virtual computing environment 330. At step 32, virtual computing environment 330 may communicate the requested utilization data to control virtual computing environment 342. At step 33, control virtual computing environment 342 may compare the received utilization data (or one or more values derived therefrom) to a threshold, and may determine that utilization of one or more resources associated with virtualization computing platform 316 is within the threshold. For example, the utilization data may be associated with virtual computing environment 330, and control virtual computing environment 342 may compare the utilization data with a threshold associated with virtual computing environment 330, and may determine that the utilization data is within the threshold (e.g., that virtual computing environment 330 is hosting an acceptable number of inactive virtual machine sessions).

At step 34, user device 304 may communicate a virtual machine session request to virtualization computing platform 316. For example, a user of user device 304 may have requested an application supported by resource set 318 via a client agent application executing on user device 304, and the client agent application may have generated a request for a corresponding virtual machine session and communicated that request to virtualization computing platform 316. The request may be received and/or processed by control virtual computing environment 342. At step 35, control virtual computing environment 342 may assign the virtual machine session request to one or more resource sets and/or one or more virtual computing environments based on one or more performance metrics, parameters, or the like. For example, control virtual computing environment 342 may assign the request to virtual computing environment 324 (e.g., based in part on the request being for an application supported by resource set 318). At step 36, virtual computing environment 324 may host a virtual machine session comprising the requested application. For example, virtual computing environment 324 may instantiate virtual machine session 404 (e.g., a virtual desktop) configured to support the requested application, may execute the requested application (e.g., application 420) within virtual machine session 404, and may provide a user of user device 304 with a view of the virtual machine session and/or the requested application executing therein (e.g., via a client agent application executing on user device 304). Referring to FIG. 5F, at step 37, user device 304 and virtualization computing platform 316 may exchange a variety of communications regarding virtual machine session 404 (e.g., input received by user device 304 that pertains to virtual machine session 404, output generated by virtualization computing platform 316 that pertains to virtual machine session 404, performance parameters, keep alive communications, and the like).

At step 38, control virtual computing environment 342 may request utilization data (e.g., memory utilization data, disk communication utilization data, and/or a number of virtual machine sessions that are inactive) from virtual computing environment 324. At step 39, virtual computing environment 324 may communicate the requested utilization data to control virtual computing environment 342. At step 40, control virtual computing environment 342 may compare the received utilization data (or one or more values derived therefrom) to a threshold, and may determine that utilization of one or more resources associated with virtualization computing platform 316 exceeds the threshold. For example, the utilization data may be associated with virtual computing environment 324, and control virtual computing environment 342 may compare the utilization data with a threshold associated with virtual computing environment 324, and may determine that the utilization data exceeds the threshold (e.g., that virtual computing environment 324 is hosting more than an acceptable number of inactive virtual machine sessions).

At step 41, responsive to determining that the utilization data exceeds the threshold, control virtual computing environment 342 may identify one or more inactive virtual machine sessions for virtualization computing platform 316 to cease to continue to host. For example, control virtual computing environment 342 may identify virtual machine session 402. In some embodiments, the inactive virtual machines session(s) to cease hosting may be identified based on a likelihood that they will be utilized again in the future (e.g., virtualization computing platform 316 may cease to continue to host inactive virtual machine sessions that are less likely to be utilized again in the future). For example, control virtual computing environment 342 may determine that virtual machine session 402 is less likely to be utilized again in the future than one or more other inactive virtual machine sessions being hosted by virtualization computing platform 316. In some embodiments, virtualization computing platform 316 may determine that the virtual machine session(s) are less likely to be utilized again in the future based on an amount of time since they were last utilized. For example, control virtual computing environment 342 may determine that virtual machine session 402 is less likely to be utilized again in the future based on its having been last utilized less recently than one or more other inactive virtual machine sessions being hosted by virtualization computing platform 316.

Additionally or alternatively, virtualization computing platform 316 may determine that the virtual machine session(s) are less likely to be utilized again in the future based on a time of day they were last utilized. For example, control virtual computing environment 342 may determine that virtual machine session 402 is less likely to be utilized again in the future based on its having been last utilized at a time of day indicative that it is less likely to be utilized again in the future than one or more other inactive virtual machine sessions being hosted by virtualization computing platform 316 (e.g., a time of day corresponding to the end of a business day). Similarly, virtualization computing platform 316 may determine that the virtual machine session(s) are less likely to be utilized again in the future based on one or more geographic locations associated with client agent application(s) last connected to the virtual machine session(s). For example, control virtual computing environment 342 may determine that virtual machine session 402 is less likely to be utilized again in the future based on its having been last connected with a client agent application associated with a geographic location that is less likely to request a virtual machine session which the virtual machine session may be utilized to fulfill (e.g., a geographic location located in a time zone that is currently outside of normal business hours).

In some embodiments, the inactive virtual machine session(s) may comprise one or more supported applications that were previously open within the inactive virtual machine session(s). For example, virtual machine session 402 may be configured to support application 414, which may have previously been open within virtual machine session 402 (e.g., associated with steps 1-4). In such embodiments, virtualization computing platform 316 may determine that the virtual machine session(s) are less likely to be utilized again in the future based on a priority level associated with the supported application(s) that were previously open within the inactive virtual machine session(s). For example, control virtual computing environment 342 may determine that virtual machine session 402 is less likely to be utilized again in the future based on application 414 being associated with a priority level lower than one or more applications supported by other inactive virtual machine sessions being hosted by virtualization computing platform 316.

In some embodiments, one or more of the inactive virtual machine sessions may be associated with one or more user accounts. For example, virtual machine session 402 may be associated with a user account of a user of user device 302 (e.g., the user of user device 302 that requested an application supported by resource set 318 in step 21). In such embodiments, virtualization computing platform 316 may determine that the virtual machine session(s) are less likely to be utilized again in the future based on a priority level associated with the user account(s). For example, control virtual computing environment 342 may determine that virtual machine session 402 is less likely to be utilized again in the future based on the user account of the user of user device 302 being associated with a priority level lower than that of one or more other user accounts associated with one or more other inactive virtual machine sessions being hosted by virtualization computing platform 316. Additionally or alternatively, virtualization computing platform 316 may determine that the virtual machine session(s) are less likely to be utilized again in the future based on one or more historical trends associated with the user account(s). For example, control virtual computing environment 342 may determine that virtual machine session 402 is less likely to be utilized again in the future based on the user account of the user of user device 302 being associated with a historical trend indicative that the user will not request a virtual machine session that virtual machine session 402 could be utilized to fulfill sooner than one or more historical trends associated with users of other inactive virtual machine sessions being hosted by virtualization computing platform 316 indicate.

At step 42, control virtual computing environment 342 may instruct virtual computing environment 324 to cease continuing to host virtual machine session 402, and, at step 43, virtual computing environment 324 may cease continuing to host virtual machine session 402.

The event flow depicted in FIGS. 5A-5F is merely illustrative. For example, one or more steps may be optional, combined with one or more other steps, or performed in a different order than illustrated. Similarly, one or more additional steps may be performed. Moreover, certain steps may be performed at locations within computing environment 300 different from where illustrated. For example, one or more of the functions described as being performed by control virtual computing environment 342 may be performed by a different element of virtualization computing platform 316 (e.g., virtual computing environment 324 and/or virtual computing environment 330). For example, virtual computing environment 324 and/or virtual computing environment 330 may compare utilization data with one or more thresholds, and, responsive to determining that the threshold(s) are exceeded, may identify one or more inactive virtual machine sessions to cease continuing to host. Similarly, one or more functions described as being performed by virtual computing environment 324 or virtual computing environment 330 may be performed by a different element of virtualization computing platform 316 (e.g., control virtual computing environment 342). For example, control virtual computing environment 342 may identify one or more inactive virtual machine sessions being hosted by virtual computing environment 324 and/or virtual computing environment 330.

FIG. 6 depicts an example method for autonomic virtual machine session lingering in accordance with one or more illustrative aspects described herein. Referring to FIG. 6, at step 602, a virtualization computing platform may host a plurality of virtual machine sessions. For example, virtualization computing platform 316 may host virtual machine sessions 402, 404, 406, 408, 410, and 412. At step 604, a portion of virtual machine sessions that are inactive may be identified from among the plurality of virtual machine sessions. For example, virtualization computing platform 316 may identify virtual machine sessions 402 and 408 as inactive. At step 606, utilization of one or more resources associated with the virtualization computing platform may be determined. For example, virtualization computing platform 316 may determine utilization of one or more resources associated with virtual computing environment 324. At step 608, a determination may be made as to whether the utilization of the one or more resources exceeds a threshold. For example, virtualization computing platform 316 may determine whether the utilization of the one or more resources associated with virtual computing environment 324 exceeds a threshold associated with virtual computing environment 324. Responsive to determining that utilization of the one or more resources does not exceed the threshold, the process may return to step 602, and the virtualization computing platform may continue to host the identified inactive virtual machine session(s). For example, responsive to determining that the utilization of the one or more resources associated with virtual computing environment 324 does not exceed the threshold associated with virtual computing environment 324, virtualization computing platform 316 may continue to host virtual machine sessions 402 and 408.

Responsive to determining that the utilization of the one or more resources exceeds the threshold, at step 610, one or more virtual machine sessions of the identified inactive virtual machine sessions may be identified for the virtualization computing platform to cease to continue to host. For example, responsive to determining that the utilization of the one or more resources associated with virtual computing environment 324 exceeds the threshold associated with virtual computing environment 324, virtualization computing platform 316 may identify virtual machine session 402 for virtualization computing platform 316 to cease to continue to host. At step 612, the virtualization computing platform may cease to continue to host the identified one or more virtual machine sessions of the inactive virtual machine sessions. For example, virtual computing environment 324 may cease to continue to host virtual machine session 402. The process may then return to step 602, and the virtualization computing platform may continue to host one or more other of the inactive virtual machine sessions. For example, virtualization computing platform 316 may continue to host virtual machine session 408.

As illustrated, the disclosure provides for autonomic virtual machine session lingering. For example, virtualization computing platform 316 may identify and continue to host one or more inactive virtual machine sessions. This may allow virtualization computing platform 316 to reduce the time required to fulfill one or more subsequent virtual machine session requests received by virtualization computing platform 316 by eliminating the need to instantiate a new virtual machine session for at least a portion of such requests. The risk that one or more new virtual machine session requests will be denied due to continued hosting of inactive virtual machine sessions may be mitigated by monitoring utilization of one or more resources of virtualization computing platform 316, and responsive to determining that utilization of the one or more resources exceeds a threshold, ceasing to continue to host one or more of the inactive virtual machine sessions. Moreover, because virtualization computing platform 316 manages the continued hosting of inactive virtual machine sessions, the availability of a hosted virtual machine session to fulfill a request for a virtual machine session received from a user device may be independent of the user device maintaining network connectivity to virtualization computing platform 316.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the following claims.

What is claimed is:

1. A method, comprising:
   hosting, by a virtualization computing platform, a plurality of virtual machine sessions;
   identifying, from among the plurality of virtual machine sessions hosted by the virtualization computing platform, a first and second portion of virtual machine sessions that are inactive, wherein the first portion of virtual machine sessions that are inactive comprises a virtual machine session associated with a user account, the virtual machine session associated with the user account being configured to support one or more supported applications, at least one of the one or more supported applications, that are now closed, having been previously opened within the virtual machine session associated with the user account;

continuing, by the virtualization computing platform, to host the first and second portion of virtual machine sessions that are inactive;

determining, by the virtualization computing platform, that utilization of one or more resources associated with the virtualization computing platform exceeds a threshold;

responsive to determining that utilization of the one or more resources associated with the virtualization computing platform exceeds the threshold, ceasing, by the virtualization computing platform, to continue to host the second portion of virtual machine sessions that are inactive;

receiving, from a client agent application, a request associated with the user account;

identifying, from among the first portion of virtual machine sessions that are inactive, the virtual machine session associated with the user account;

connecting the client agent application with the virtual machine session associated with the user account, the virtual machine session associated with the user account having been continually hosted by the virtualization computing platform since the at least one of the one or more supported applications having been previously opened within the virtual machine session associated with the user account was closed; and opening, within the virtual machine session associated with the user account, the at least one of the one or more supported applications having been previously opened within the virtual machine session.

2. The method of claim 1, wherein the first portion of virtual machine sessions that are inactive comprises a virtual machine session that was disconnected from a client agent application with which the virtual machine session was previously connected.

3. The method of claim 2, comprising:
receiving, from the client agent application, a request to connect to a virtual machine session; and
reconnecting the client agent application with the virtual machine session that was disconnected from the client agent application, the virtual machine session that was disconnected from the client agent application having been continually hosted by the virtualization computing platform since being disconnected from the client agent application.

4. The method of claim 1, wherein the virtualization computing platform comprises a plurality of virtual computing environments, each of the plurality of virtual computing environments being configured to host a plurality of virtual machine sessions.

5. The method of claim 4, wherein determining that utilization of the one or more resources associated with the virtualization computing platform exceeds the threshold comprises determining by at least one of the plurality of virtual computing environments that utilization of one or more resources associated with the at least one of the plurality of virtual computing environments exceeds a threshold associated with the at least one of the plurality of virtual computing environments, and wherein ceasing to continue to host the second portion of virtual machine sessions that are inactive comprises ceasing to host one or more virtual machine sessions that the at least one of the plurality of virtual computing environments is continuing to host.

6. The method of claim 4, wherein the plurality of virtual computing environments includes at least a first portion of virtual computing environments associated with a first supported application and a second portion of virtual computing environments associated with a second supported application, the second supported application being a different application from the first supported application.

7. The method of claim 6, wherein determining that utilization of the one or more resources associated with the virtualization computing platform exceeds the threshold comprises determining by a virtual computing environment of the plurality of virtual computing environments that utilization of one or more resources associated with either the first portion of virtual computing environments or the second portion of virtual computing environments exceeds a threshold associated with the either first portion of virtual computing environments or the second portion of virtual computing environments, and wherein ceasing to continue to host the second portion of virtual machine sessions that are inactive comprises ceasing to host one or more virtual machine sessions of the second portion of virtual machine sessions that either the first portion of virtual computing environments is continuing to host or the second portion of virtual computing environments is continuing to host, the virtual computing environment being a virtual computing environment distinct from the first portion of virtual computing environments and the second portion of virtual computing environments.

8. The method of claim 1, wherein determining that utilization of the one or more resources associated with the virtualization computing platform exceeds the threshold comprises determining that at least one of memory utilization exceeds a predetermined threshold, disk communication utilization exceeds the predetermined threshold, or the second portion of virtual machine sessions that are inactive exceeds the predetermined threshold.

9. The method of claim 1, comprising, prior to ceasing to continue to host the second portion of virtual machine sessions that are inactive, identifying one or more of the second portion of virtual machine sessions based on a likelihood that the one or more of the second portion of virtual machine sessions will be utilized again in the future.

10. The method of claim 9, wherein identifying the one or more of the second portion of virtual machine sessions based on the likelihood that the one or more of the second portion of virtual machine sessions will be utilized again in the future comprises determining that the one or more of the second portion of virtual machine sessions are less likely to be utilized again in the future than other virtual machine sessions of the second portion of virtual machine sessions.

11. The method of claim 9, comprising determining the likelihood that the one or more of the second portion of virtual machine sessions will be utilized again in the future based on an amount of time since the one or more of the second portion of virtual machine sessions were last utilized.

12. The method of claim 9, comprising determining the likelihood that the one or more of the second portion of virtual machine sessions will be utilized again in the future based on a time of day when the one or more of the second portion of virtual machine sessions were last utilized.

13. The method of claim 9, comprising determining the likelihood that the one or more of the second portion of virtual machine sessions will be utilized again in the future based on one or more geographic locations associated with one or more client agent applications that were last connected to the one or more of the second portion of virtual machine sessions.

14. The method of claim 9, wherein the one or more of the second portion of virtual machine sessions comprise one or more supported applications that were previously open within the one or more of the second portion of virtual machine sessions, the method comprising determining the likelihood that the one or more of the second portion of virtual machine sessions will be utilized again in the future based on a priority level associated with the one or more supported applications that were previously open within the one or more of the second portion of virtual machine sessions.

15. The method of claim 9, wherein the one or more of the second portion of virtual machine sessions are associated with one or more user accounts, the method comprising determining the likelihood that the one or more of the second portion of virtual machine sessions will be utilized again in the future based on a priority level associated with the one or more user accounts.

16. The method of claim 9, wherein the one or more of the second portion of virtual machine sessions are associated with one or more user accounts, the method comprising determining the likelihood that the one or more of the second portion of virtual machine sessions will be utilized again in the future based on one or more historical usage trends associated with the one or more user accounts.

17. The method of claim 1, wherein ceasing comprises ceasing to continue to host two or more of the second portion of virtual machine sessions that are inactive.

18. A system, comprising:
at least one processor; and
a memory storing instructions that, when executed by the at least one processor, cause the system to:
host, by a virtualization computing platform, a plurality of virtual machine sessions;
identify, from among the plurality of virtual machine sessions hosted by the virtualization computing platform, a first and second portion of virtual machine sessions that are inactive, wherein the first portion of virtual machine sessions that are inactive comprises a virtual machine session associated with a user account, the virtual machine session associated with the user account being configured to support one or more supported applications, at least one of the one or more supported applications, that are now closed, having been previously opened within the virtual machine session associated with the user account;
continue, by the virtualization computing platform, to host the first and second portion of virtual machine sessions that are inactive;
determine, by the virtualization computing platform, that utilization of one or more resources associated with the system exceeds a threshold;
responsive to determining that utilization of the one or more resources associated with the system exceeds the threshold, cease, by the virtualization computing platform, to continue to host the second portion of virtual machine sessions that are inactive;
receive, from a client agent application, a request associated with the user account;
identify, from among the first portion of virtual machine sessions that are inactive, the virtual machine session associated with the user account;
connect the client agent application with the virtual machine session associated with the user account, the virtual machine session associated with the user account having been continually hosted by the virtualization computing platform since the at least one of the one or more supported applications having been previously opened within the virtual machine session associated with the user account was closed; and
open, within the virtual machine session associated with the user account, the at least one of the one or more supported applications having been previously opened within the virtual machine session.

19. One or more non-transitory computer-readable media having instructions stored thereon, that when executed by one or more computers, cause the one or more computers to:
utilize a virtualization computing platform to host a plurality of virtual machine sessions;
identify, from among the plurality of virtual machine sessions hosted by the virtualization computing platform, a first and second portion of virtual machine sessions that are inactive, wherein the first portion of virtual machine sessions that are inactive comprises a virtual machine session associated with a user account, the virtual machine session associated with the user account being configured to support one or more supported applications, at least one of the one or more supported applications, that are now closed, having been previously opened within the virtual machine session associated with the user account;
continue, by the virtualization computing platform, to utilize the virtualization computing platform to host the first and second portion of virtual machine sessions that are inactive;
determine, by the virtualization computing platform, that utilization of one or more resources associated with the virtualization computing platform exceeds a threshold;
responsive to determining that utilization of the one or more resources associated with the virtualization computing platform exceeds the threshold, cease, by the virtualization computing platform, to continue to host the second portion of virtual machine sessions that are inactive;
receive, from a client agent application, a request associated with the user account;
identify, from among the first portion of virtual machine sessions that are inactive, the virtual machine session associated with the user account;
connect the client agent application with the virtual machine session associated with the user account, the virtual machine session associated with the user account having been continually hosted by the virtualization computing platform since the at least one of the one or more supported applications having been previously opened within the virtual machine session associated with the user account was closed; and
open, within the virtual machine session associated with the user account, the at least one of the one or more supported applications having been previously opened within the virtual machine session.

* * * * *